United States Patent [19]

Sieper

[11] 3,820,279

[45] June 28, 1974

[54] WORM CATCHING DEVICE WITH SAFETY FEATURES

[75] Inventor: Horst Sieper, Neuss, Germany

[73] Assignee: Electronik und Apparatebau GmbH Sintronik, Flensburg-Harrislee, Germany

[22] Filed: Nov. 9, 1972

[21] Appl. No.: 304,928

[30] Foreign Application Priority Data
Nov. 16, 1971 Germany............................ 2156741

[52] U.S. Cl...................... 47/1.3, 231/2 E, 219/127
[51] Int. Cl................................................. A01g 7/04
[58] Field of Search......... 47/1.3; 231/2 E; 219/127, 219/437

[56] References Cited
UNITED STATES PATENTS
2,450,597  10/1948  Karnowski...................... 47/1.3
2,484,147  10/1949  Bartel.............................. 231/2 E
2,607,164  8/1952  Fenton............................... 47/1.3
3,641,310  2/1972  Wilson............................. 219/127

FOREIGN PATENTS OR APPLICATIONS
211,208  1968  U.S.S.R.............................. 21/2 E

*Primary Examiner*—Stephen C. Pellegrino

[57] ABSTRACT

Disclosed is a worm catching device comprising electrodes having telescoping, insulating tubes thereon that are displaced to activate switch means upon insertion of the electrode in soil. The device has additional, manually operated switch means and both switch means constitute personal safety features.

5 Claims, 4 Drawing Figures

Fig. 3
Fig. 4
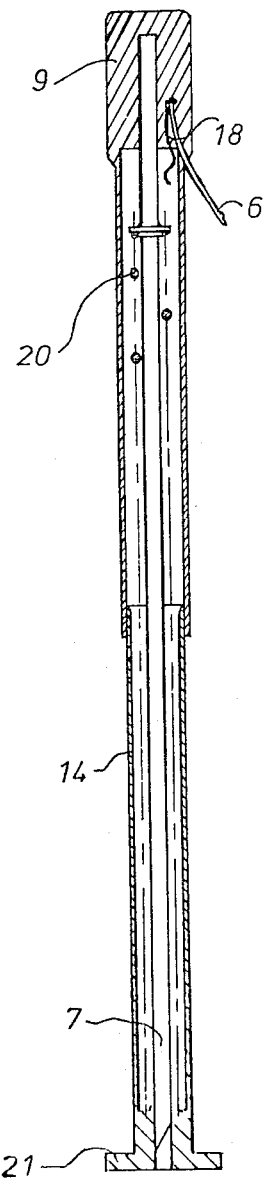
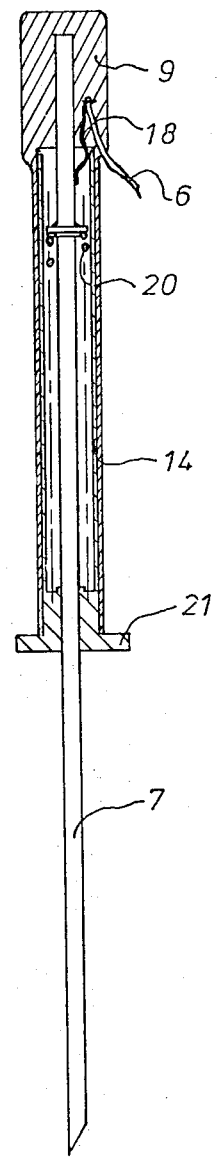

WORM CATCHING DEVICE WITH SAFETY FEATURES

BACKGROUND OF THE INVENTION

It is well known that earthworms are a preferred bait for sports fishermen. The most common, but by far the most laborious, method of procuring earthworms is by digging in moist, organic-rich soil.

A more convenient method of procuring earthworms involves the insertion of metal rods into the soil and passing an electrical current through the soil from one rod to another. The metal rods, or electrodes, are positioned relatively closely to each other and when energized, pass a current through the soil therebetween. The current passing through the soil creates a hostile environment for the earthworms and they are driven to the surface where they may be manually collected for use in sports fishing.

The use of electrodes in the procurement of earthworms has, up to now, involved a certain degree of personal risk inasmuch as exposed electrodes constitute an electrical shock hazard. The individual collecting the earthworms was subjected to electrical shock when handling one or both of the uninsulated or exposed electrodes when current was passing therethrough. For example, the fisherman might frequently grasp both electrodes to reposition them in a different location and, if the fisherman inadvertently failed to deenergize the electrodes, he would receive an electrical shock.

Thus, it is believed to be desirable to provide electrodes of a type offering safety from the aforementioned hazards.

SUMMARY OF THE INVENTION

The present invention is a worm catching device employing electrodes adapted to be positioned in the soil and having a self-contained power source such as a battery and a frequency generator. Low frequency current surges may be generated and passed through the soil from one electrode to the other. Worms will be driven out of the ground in the region traversed by such current surges and once on the surface, may be easily captured.

The worm catching device has personal protection safety features including a manually operated safety button associated with the power pack and safety switches on the electrodes. The electrodes have telescoping insulated tubes thereon that fully enclose a metal spike but which are displaced when the metal spike is inserted into the soil. Additional switch means are associated with each electrode and both the electrode switches and the safety button switch must be actuated before current can flow through the electrodes.

The device includes a portable power source such as a battery, a hand generator or some other appropriate source of power and a frequency generator, and both the power source and the generator constitute the power pack. The two electrodes are connected to the power pack by appropriate electrical leads. The device is easily portable so that the sports fisherman may use the device at any time and at any suitable place.

Each electrode has a central metal spike for insertion into the ground and a non-conductive telescoping tube surrounding the metal spike. This telescoping tube includes two sections which can be moved relative to each other in telescoping fashion against the force of a spring surrounding the metal spike. The spring insures that the two tubes remain extended to enclose fully the metal spike when the electrode is not in use. Electrical switch means are associated with a cap at the upper end of the electrode and are positioned next to the metal spike. The switch means itself is a strip of spring steel or the like supported within the interior of the cap means on the electrode and connected to the electrical lead from the power pack.

When it is desired to push the metal spike of the electrode into the ground, the electrode is grasped by the cap at the upper end of the outer tube. An abutment means on the lower end of the inside telescoping tube abuts against the ground. The outer telescoping tube with cap and switch means at its upper end also supports the spike and, when the electrode is pushed into the ground, the outer tube telescopes over the inner tube. The upper edge of the inner tube contacts the switch means in the electrode cap and displaces the switch against the metal spike thereby connecting the metal spike to the power source through the electrical lead.

As an additional safety feature, a manually operated safety switch is located on the power pack and is of the type that must be continually depressed in order to complete the circxuit between the power pack and the electrode. Since the safety button must be continually depressed, the operator has only one hand free and would be unable to grasp both electrodes when they are in position in the earth and are energized.

Further features of the invention will be apparent from an inspection of the accompanying drawings and a description of a preferred embodiment of the electrodes.

DESCRIPTION OF THE DRAWING

FIG. 3 is a sectional view of the electrode of the worm catching device when the telescoping protection tube is fully extended.

FIG. 4 is a sectional view of the electrode of the worm catching device when the telescoping protection tube is in its fully compressed position thereby actuating the switch means.

DESCRIPTION OF A PREFERRED EMBODIMENT

Figure 1:
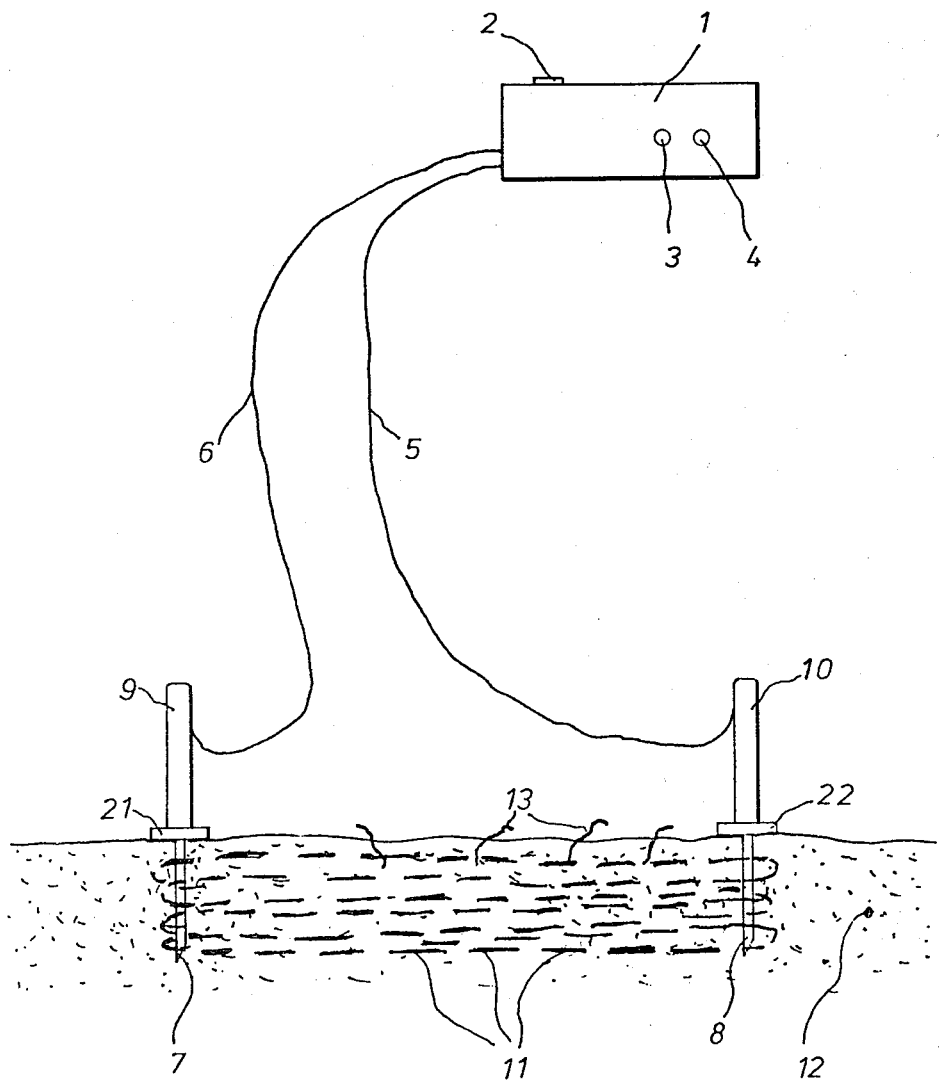
FIG. 1 is a schematic representation of the worm catching device with the electrodes positioned in the soil.

The worm catching device illustrated in FIG. 1 comprises power pack 1 containing a power source such as a battery, and a frequency generating device. Manual safety button 2 is positioned on the exterior of the power pack case and, with reference to FIG. 2, constitutes a switch means between battery 16 and frequency generator 17. Terminals 3 and 4 serve as connection means for an external power source that may be used, for example, to recharge a built-in rechargeable battery 16. Electrical leads 5 and 6 connect electrodes 7 and 8 to the power pack and, as is visible in FIGS. 1, 3 and 4, the leads pass through telescoping, insulating protection tubes 9 and 10.

With particular reference to FIG. 1, electrodes 7 and 8 are inserted in the ground such that abutment plates 21 and 22 contact the surface of the ground and the electrodes are driven into the earth to a degree sufficient to actuate safety switches contained within insulating tubes 9 and 10. Said switching means will be described in greater detail below. After positioning electrodes 7 and 8 in the earth 12, safety button 2 is manually depressed, thereby completing the electrical circuit between battery 16 and frequency generator 17. Low frequency current indicated by dashed lines 11 flows from one electrode to the other and creates a hostile environment in the region traversed by the current. Worms 13 are thereby driven to the surface of the earth.

Figure 2:
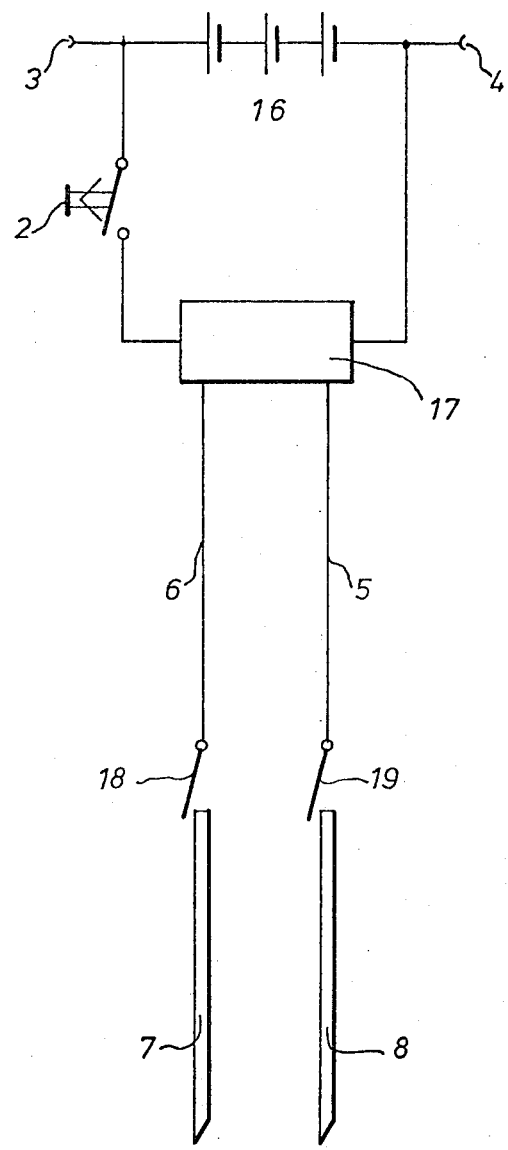
FIG. 2 is a schematic representation of the electrical circuit means associated with the worm catching device.

With particular reference to FIG. 2, leads 5 and 6 are connected to electrodes 8 and 7, respectively, through switches 19 and 18, respectively. Means are provided to close switches 18 and 19 automatically when the electrodes are inserted in the ground and, when manual switch 2 is depressed, a complete circuit is created from the battery through the frequency generator, the electrical leads, the electrodes, and the earth. Opening any of switches 2, 18 or 19 will break the circuit and prevent current from flowing through the system.

With particular reference to FIG. 3, the electrode includes an inner insulating and telescoping tube 14, an outer insulating and telescoping tube 9 which has, at its upper end, an insulating cap, and a metal spike 7. The upper end of spike 7 is fixedly mounted in the cap and the lower end of spike 7 is slidably supported in a hole passing through abutment plate 21.

Switch means 18 is mounted in the interior of the cap and is positioned adjacent to but not in contact with metal spike 7. Switch means 18 is a strip of spring steel and is connected to the power pack through lead 6.

Spring means 20 surrounds metal spike 7 and extends from a flange on the upper end of metal spike 7 to an interior surface on abutment means 21 of inner tube 14. Spring 20 is employed to assure that tubes 14 and 9 will remain fully extended when the electrode is not in use to assure thereby that personal contact with metal spike 7 will not occur. It is noted that in the inoperative position illustrated in FIG. 3, the entire metal spike 7 is enclosed by insulating tubes 14 and 9. Tubes 14 and 9 are formed from a nonconductive material such as plastic or the like.

The electrode is illustrated in an operative or "in use" position in FIG. 4. When the sports fisherman inserts the electrode into the ground, he grasps the electrode by upper cap 9 and positions abutment plate 21 against the ground. By pressing downwardly, spike 7 will be driven into the ground and outer tube 9 will telescopically collapse around inner tube 14. It is noted that the force of spring 20 must be chosen so that friction between the soil and metal spike 7 will be sufficient to overcome the force of the spring and prevent the spring from popping the electrode out of the ground.

As the two tubes telescopically collapse, the upper edge of inner tube 14 engages a curved, camming portion of switch 18 and, as is visible in FIG. 4, displaces switch 18 such that it moves toward and is placed in contact with the surface of spike 7. The circuit between lead 6 and spike 7 is now completed and when safety switch 2 on the power pack is depressed, current may flow between the power pack and the electrode. When both electrodes are positioned in the earth, the current may flow from one electrode to the other, thereby completing the circuit in the device.

It is understood that modifications of this invention may be encompassed within the scope of the appended claims.

I claim:

1. Apparatus for use in a worm catching device comprising an electrically conductive spike electrode adapted to be inserted into the earth, an outer, nonconductive telescoping tube with cap means on one end thereof, said spike having a first end rigidly attached to said cap means and being aligned within the interior of said outer tube, an inner, nonconductive tube between said outer tube and said spike, said inner tube being telescopically slidable within said outer tube, and electrode switch means mounted in the interior of said cap means so that said switch means may be actuated by the telescopic collapse of said inner tube within said outer tube.

2. The apparatus of claim 1 including biasing means capable of exerting a force between said tubes whereby said inner tube may be extended from said outer tube so that both tubes when extended completely enclose said spike.

3. The apparatus of claim 1 wherein said electrode switch means comprises an electrically conductive, flexible member having camming means thereon, said camming means being adapted to be engaged by an end of said inner tube when said inner tube is telescopically collapsed within said outer tube to move said electrode switch means into contact with said spike, and electrical lead means connected to said electrode switch means to provide power thereto.

4. The apparatus of claim 1 further comprising a power source including a battery and a frequency generator, manual switch means connecting said battery to said generator and an electrical lead connecting said power source to said electrode switch means whereby electrical current may flow from said battery to said frequency generator and then to said spike when both said electrode and said manual switches are closed.

5. The apparatus of claim 4 including a second electrode of the same type connected to said power source, said second electrode being connected to said power source whereby both said electrodes may be inserted in the earth to actuate thereby both said electrode switch means and said manual switch means may be manually actuated to complete an electrical circuit to pass current from one said electrode through the earth to the second of said electrodes.

* * * * *